(12) United States Patent
Chang (10) Patent No.: US 10,399,466 B2
(45) Date of Patent: Sep. 3, 2019

(54) SEAT RECLINER FOR VEHICLE (71) Applicant: HYUNDAI DYMOS INCORPORATED, Seosan-si, Chungcheongnam-do (KR)

(72) Inventor: Seung Hun Chang, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 0 days.

(21) Appl. No.: 15/980,957

(22) Filed: May 16, 2018

(65) Prior Publication Data
US 2019/0193600 A1   Jun. 27, 2019

(30) Foreign Application Priority Data

Dec. 26, 2017   (KR) .................. 10-2017-0180244

(51) Int. Cl.
*B60N 2/22* (2006.01)
*B60N 2/225* (2006.01)

(52) U.S. Cl.
CPC .................. *B60N 2/2252* (2013.01)

(58) Field of Classification Search
CPC .................. B60N 2/2252
See application file for complete search history.

(56) References Cited

U.S. PATENT DOCUMENTS

| | | | | |
|---|---|---|---|---|
| 5,524,970 A * | 6/1996 | Kienke | ................ | B60N 2/2255 297/362 |
| 5,634,380 A * | 6/1997 | Scholz | ................ | B60N 2/2252 297/362 X |
| 6,305,748 B1 * | 10/2001 | Ohba | ................ | B60N 2/2252 297/362 |
| 6,619,743 B1 * | 9/2003 | Scholz | ................ | B60N 2/225 297/362 |
| 6,637,821 B2 * | 10/2003 | Lee | ................ | B60N 2/2252 297/362 |
| 6,712,430 B2 * | 3/2004 | Ito | ................ | B60N 2/0232 297/362 |
| 6,805,650 B2 * | 10/2004 | Branov | ................ | B60N 2/2254 297/362 |

(Continued)

FOREIGN PATENT DOCUMENTS

| | | |
|---|---|---|
| JP | 2016010659 | 1/2016 |
| KR | 100785624 | 12/2007 |
| KR | 101711826 | 3/2017 |

*Primary Examiner* — Rodney B White
(74) *Attorney, Agent, or Firm* — Burris Law, PLLC (57) ABSTRACT Disclosed is a seat recliner for a vehicle, the seat recliner including: a flange provided with internal teeth on an inner circumferential surface thereof; a gear plate disposed in the internal teeth of the flange, provided with external teeth along an edge thereof to be engaged with the internal teeth of the flange with being eccentric with respect to the flange, and formed with a through-hole at a center thereof; a rotating cam disposed at a center of the through-hole of the gear plate; a wedge cam held between the rotating cam and an inner circumferential surface of the through-hole of the gear plate to maintain eccentricity of the rotating cam and the gear plate, and provided with a lubrication part on a contact surface with the rotating cam to preserve lubricant; and an elastic member configured to press the wedge cam.

10 Claims, 8 Drawing Sheets

(56) References Cited

U.S. PATENT DOCUMENTS

| | | | | |
|---|---|---|---|---|
| 6,918,635 B2 * | 7/2005 | Finner | B60N 2/2252 | |
| | | | 297/362 | |
| 7,090,299 B2 * | 8/2006 | Lange | B60N 2/2252 | |
| | | | 297/362 | |
| 7,188,903 B2 * | 3/2007 | Finner | B60N 2/2252 | |
| | | | 297/362 | |
| 7,278,689 B2 * | 10/2007 | Guillouet | B60N 2/2252 | |
| | | | 297/362 | |
| 7,390,061 B2 * | 6/2008 | Lange | B60N 2/2252 | |
| | | | 297/362 | |
| 7,455,361 B2 * | 11/2008 | Stemmer | B60N 2/2252 | |
| | | | 297/362 | |
| 7,461,900 B2 * | 12/2008 | Lange | B60N 2/2252 | |
| | | | 297/362 | |
| 7,484,806 B2 * | 2/2009 | Ito | B60N 2/2252 | |
| | | | 297/362 | |
| 7,497,519 B2 * | 3/2009 | Dill | B60N 2/2252 | |
| | | | 297/362 | |
| 7,607,737 B2 * | 10/2009 | Liebich | B60N 2/2254 | |
| | | | 297/362 | |
| 7,611,436 B2 * | 11/2009 | Ito | B60N 2/181 | |
| | | | 297/362 X | |
| 7,644,989 B2 * | 1/2010 | Baloche Faurecia | B60N 2/225 | |
| | | | 297/362 | |
| 7,789,464 B2 * | 9/2010 | Stemmer | B60N 2/2254 | |
| | | | 297/362 | |
| 8,128,169 B2 * | 3/2012 | Narita | B60N 2/0232 | |
| | | | 297/362 | |
| 8,672,408 B2 * | 3/2014 | Legras | B60N 2/2255 | |
| | | | 297/362 X | |
| 8,915,548 B2 * | 12/2014 | Stilleke | B60N 2/2252 | |
| | | | 297/362 X | |
| 8,931,842 B2 * | 1/2015 | Hiemstra | B60N 2/2252 | |
| | | | 297/362 | |
| 8,944,508 B2 * | 2/2015 | Ohba | B60N 2/682 | |
| | | | 297/362 | |
| 8,950,811 B2 * | 2/2015 | Narita | B60N 2/2254 | |
| | | | 297/362 | |
| 9,033,418 B2 * | 5/2015 | Jokiel | B60N 2/2254 | |
| | | | 297/362 | |
| 2005/0110322 A1 * | 5/2005 | Cha | B60N 2/2252 | |
| | | | 297/362 | |
| 2005/0179297 A1 * | 8/2005 | Finner | B60N 2/2252 | |
| | | | 297/362 | |
| 2006/0290187 A1 * | 12/2006 | Scholz | B60N 2/0232 | |
| | | | 297/362 | |
| 2007/0138853 A1 * | 6/2007 | Ito | B60N 2/2252 | |
| | | | 297/362 | |
| 2008/0001458 A1 * | 1/2008 | Hoshihara | B60N 2/0232 | |
| | | | 297/362 | |
| 2008/0136242 A1 * | 6/2008 | Stemmer | B60N 2/2252 | |
| | | | 297/362 | |
| 2008/0193203 A1 * | 8/2008 | Voss | B60N 2/2252 | |
| | | | 403/97 | |
| 2010/0244530 A1 * | 9/2010 | Kitano | B60N 2/20 | |
| | | | 297/362 | |
| 2010/0308634 A1 * | 12/2010 | Narita | B60N 2/2252 | |
| | | | 297/362 | |
| 2012/0169104 A1 * | 7/2012 | Stilleke | B60N 2/236 | |
| | | | 297/362 | |
| 2012/0205956 A1 * | 8/2012 | Nock | B60N 2/2252 | |
| | | | 297/362 | |
| 2012/0223562 A1 * | 9/2012 | Assmann | B60N 2/2252 | |
| | | | 297/362 | |
| 2013/0207434 A1 * | 8/2013 | Stilleke | B60N 2/2252 | |
| | | | 297/362 | |

* cited by examiner

SEAT RECLINER FOR VEHICLE

CROSS-REFERENCE TO RELATED APPLICATIONS

The present application claims priority to and the benefit of Korean Patent Application No. 10-2017-0180244, filed Dec. 26, 2017. The disclosure of the above application is incorporated herein by reference.

FIELD

The present disclosure relates to a seat recliner for a vehicle, in which lubrication is enhanced between a wedge cam and a rotating cam and inhibits wear or sticking of the wedge cam.

BACKGROUND

The statements in this section merely provide background information related to the present disclosure and may not constitute prior art.

A recliner is provided between a seat cushion and a seat back of a vehicle to release the lock for reclining if necessary, and to lock after reclining for maintaining the angle.

Generally, the recliner is configured such that a fixed flange is fixed, a rotating flange is relatively rotated, a gear plate is provided thereinside to be rotated eccentrically with the rotating flange, and by the rotation of the gear plate, the engaged rotating flange is rotated to implement the reclining.

For eccentricity of the gear plate, the gear plate is provided with a rotating cam and a wedge cam, wherein the wedge cam is always held between the rotating cam and the gear plate by a spring such that the gear plate remains eccentric with respect to the rotating cam.

However, since the wedge cam is always held between the rotating cam and the gear plate, the wedge cam is worn out, and sticking rather than slipping occurs due to excessive contact.

Generally, there are a bush and a bearing between the wedge cam and the gear plate so it does not matter, but there is no space for inserting a bearing between the wedge cam and the rotating cam. Even if the lubricant is charged, the end of the wedge cam pushes out the lubricant, which causes wear or sticking issues.

SUMMARY

The present disclosure provides a seat recliner for a vehicle, in which a pattern or dimple is formed on a contact surface of a wedge cam, thereby enhancing lubrication between the wedge cam and a rotating cam, and thus, it is possible to inhibit wear or sticking of the wedge cam.

The present disclosure provides a seat recliner for a vehicle, the seat recliner including a flange provided with internal teeth on an inner circumferential surface thereof. A gear plate is disposed in the internal teeth of the flange and is configured to have an outer diameter smaller than an inner diameter of the flange. The gear plate is provided with external teeth along an edge thereof to be engaged with the internal teeth of the flange with being eccentric with respect to the flange, and formed with a through-hole at a center thereof. A rotating cam is disposed at a center of the through-hole of the gear plate, and configured to be rotated by being connected to a shaft. A wedge cam is held between the rotating cam and an inner circumferential surface of the through-hole of the gear plate to maintain eccentricity of the rotating cam and the gear plate. The wedge cam is provided with a lubrication part in a form of an engraved or embossed pattern or a dimple on a contact surface with the rotating cam to preserve lubricant between the contact surface and the rotating cam. An elastic member is provided and configured to press the wedge cam between the rotating cam and the inner circumferential surface of the through-hole of the gear plate.

The rotating cam may be eccentric to a side of the through-hole of the gear plate, and the wedge cam may be provided in pair at opposite sides between the rotating cam and the inner circumferential surface of the through-hole of the gear plate.

A bearing may be coupled on the inner circumferential surface of the through-hole of the gear plate, and the wedge cam may be held between the rotating cam and an inner circumferential surface of the bearing.

The contact surface of the wedge cam may be brought into contact with an outer circumferential surface of the rotating cam at first and second end portions thereof, and may be spaced apart from the outer circumferential surface of the rotating cam at a middle portion thereof.

The lubrication part may be provided at each of the first and second end portions of the contact surface of the wedge cam, with which the outer circumferential surface of the rotating cam is brought into contact.

The lubrication part may be configured such that a plurality of grooves formed in a vertical direction is continuous to form a pattern.

The lubrication part may be configured such that a plurality of grooves formed in a diagonal direction is continuous to form a pattern.

The lubrication part may be configured such that a plurality of grooves formed in a horizontal direction is continuous to form a pattern.

The lubrication part may be configured such that a plurality of grooves formed in a wave shape is continuous to form a pattern.

The lubrication part may be configured such that a plurality of dimples is continuous at predetermined intervals to form a pattern.

According to the seat recliner for a vehicle of the present disclosure, since a pattern or dimple is formed on a contact surface of a wedge cam, thereby enhancing lubrication between the wedge cam and a rotating cam, thus, it is possible to inhibit wear or sticking of the wedge cam.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, an exemplary form of the present disclosure will be described in more detail with reference to the accompanying drawings.

Figure 1:
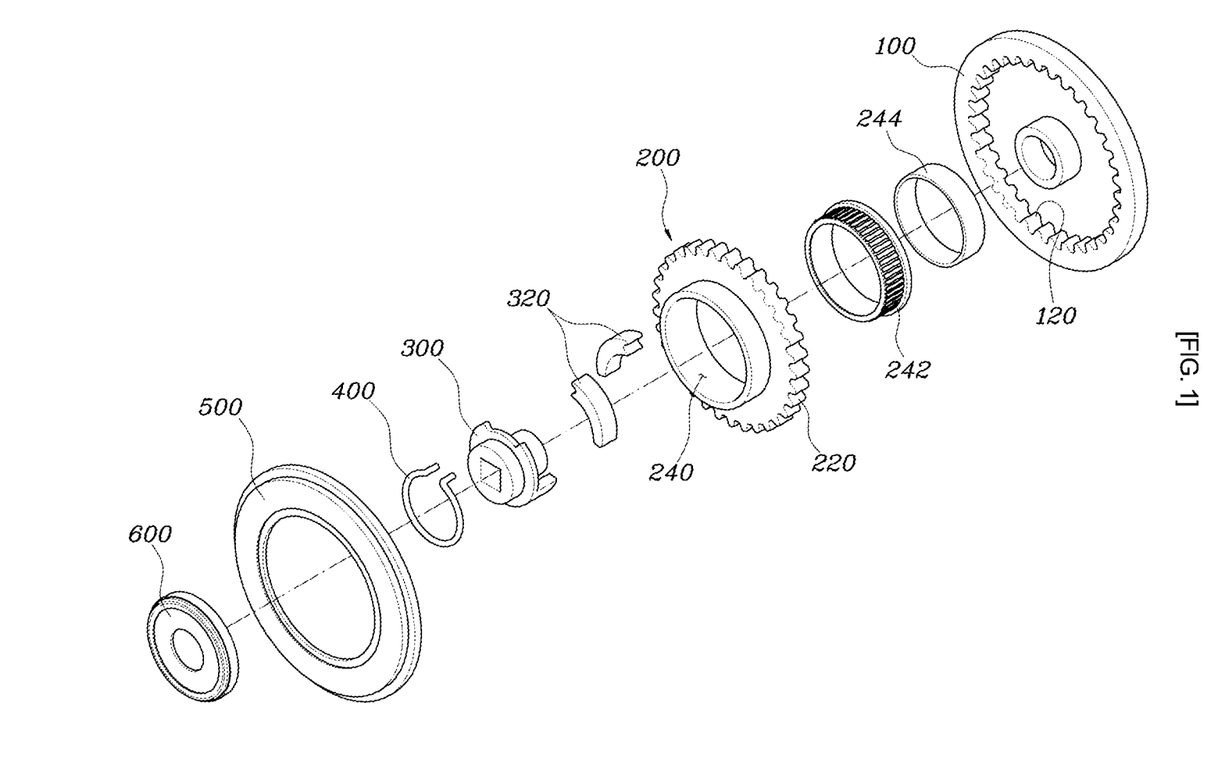
FIG. 1 is an exploded perspective view of a seat recliner for a vehicle according to the present disclosure.

FIG. 1 is an exploded perspective view showing a seat recliner for a vehicle according to one form of the present disclosure, wherein the seat recliner for a vehicle according to the present disclosure includes: a flange 100 provided with internal teeth 120 on an inner circumferential surface thereof; a gear plate 200 disposed in the internal teeth 120 of the flange 100, configured to have an outer diameter smaller than an inner diameter of the flange, provided with external teeth 220 along an edge thereof to be engaged with the internal teeth 120 of the flange 100 with being eccentric with respect to the flange 100, and formed with a through-hole 240 at a center thereof; a rotating cam 300 disposed at a center of the through-hole 240 of the gear plate 200, and configured to be rotated by being connected to a shaft; a wedge cam 320 held between the rotating cam 300 and an inner circumferential surface of the through-hole 240 of the gear plate 200 to maintain eccentricity of the rotating cam 300 and the gear plate 200, and provided with a lubrication part H in a form of an engraved or embossed pattern or a dimple on a contact surface 322 with the rotating cam 300 to preserve lubricant between the contact surface 322 and the rotating cam 300; and an elastic member 400 configured to press the wedge cam 320 between the rotating cam 300 and the inner circumferential surface of the through-hole 240 of the gear plate 200.

The flange 100, which is a rotating part, is provided with the internal teeth 120 on an inner circumferential surface thereof. The gear plate 200 is disposed in the internal teeth 120 of the flange 100. The gear plate 200 is configured to have the outer diameter smaller than the inner diameter of the flange 100, and is provided with the external teeth 220 along the edge thereof. Thereby, in the state where the gear plate 200 is eccentric with respect to the flange 100, the external teeth 220 are engaged with the internal teeth 120 of the flange 100. The gear plate 200 is configured to be smaller than the flange 100 and to be rotated by being engaged with the flange while being eccentric with respect to the flange, wherein by the rotation of the gear plate 200, the flange 100 is rotated in a decelerated state, which allows smooth reclining operation.

Further, the gear plate 200 is formed with the through-hole 240 at the center thereof. The rotating cam 300 is disposed at the center of the through-hole 240 of the gear plate 200. The rotating cam 300 is rotated by being connected to a shaft, wherein the shaft is rotated manually or automatically using a motor. When the shaft is rotated, the rotating cam 300 is rotated, and accordingly, the gear plate 200 is rotated. The reason why the rotation of the rotating glass 300 is transmitted to the rotation of the gear plate 200 is because the wedge cam 320 maintains eccentricity.

The wedge cam 320 is held between the rotating cam 300 and the inner circumferential surface of the through-hole 240 of the gear plate 200 to maintain the eccentricity of the rotating cam 300 and the gear plate 200. Further, the wedge cam 320 is provided with the lubrication part H in the form of an engraved or embossed pattern or a dimple on the contact surface 322 with the rotating cam 300 to preserve lubricant between the contact surface 322 and the rotating cam 300. Further, the elastic member 400 is configured to press the wedge cam 320 between the rotating cam 300 and the inner circumferential surface of the through-hole 240 of the gear plate 200.

Figure 2:
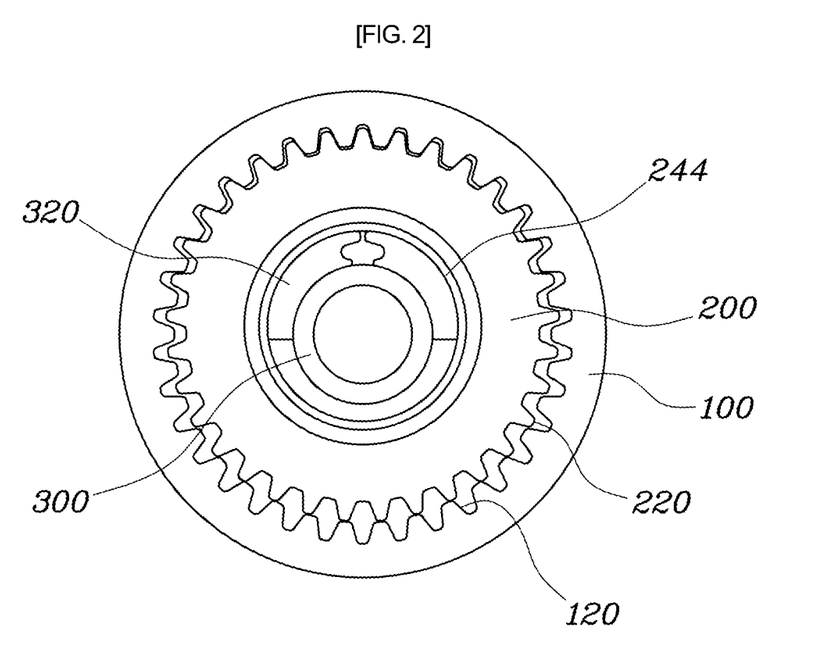
FIG. 2 is a sectional view of a seat recliner for a vehicle according to the present disclosure.

In the state of FIG. 2, a pair of the wedge cams 320 is pressed in opposite directions by the elastic member 400, and is held between the rotating cam 300 and the inner circumferential surface of the through-hole 240 of the gear plate 200. In this state, the eccentricity of the rotating cam 300 and the gear plate 200 is maintained, and when the rotating cam 300 is rotated, the gear plate 200 is rotated along with the rotating cam 300. The gear plate 200 is again eccentrically rotated with respect to the flange 100, and consequently, the flange 100 is rotated in a manner concentric with the rotating cam 300.

Herein, to maintain the eccentricity between the rotating cam 300 and the gear plate 200 when the rotating cam 300 is rotated, the wedge cam 320 is held between the rotating cam 300 and the inner circumferential surface of the through-hole 240 of the gear plate 200. Here, when the wedge cam 320 is overly held, the rotation of the rotating cam 300 may be disturbed, or the surface of the rotating cam 300 or the wedge cam 320 may be worn and adhered due to the friction between the wedge cam 320 and the rotating cam 300.

Figure 4:
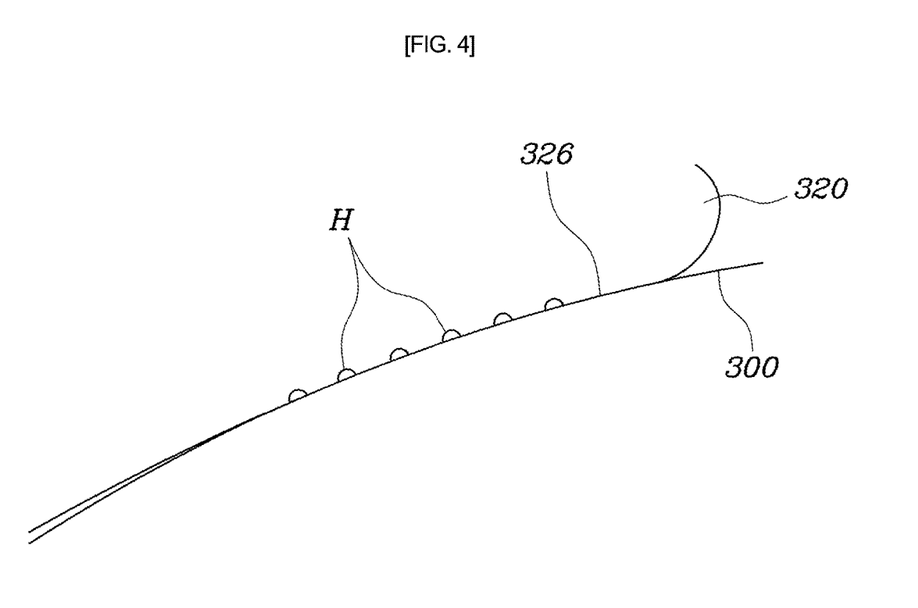
FIG. 4 is a detailed view of a wedge cam of the seat recliner for a vehicle shown in FIG. 1.

Accordingly, there should be sufficient lubrication between the wedge cam 320 and the rotating cam 300, and to achieve this, the lubricant is filled between surfaces of the wedge cam 320 and the rotating cam 300. As shown in FIG. 4, the wedge cam 320 is provided with the lubrication part H in the form of an engraved or embossed pattern or a dimple on the contact surface 322 with the rotating cam 300 to preserve the lubricant between the contact surface 322 and the rotating cam 300.

Without the pattern or dimple, the edge of the wedge cam 320 slips through the surface of the rotating cam 300, which pushes the lubricant on the surface of the rotating cam 300, and on the contrary, with the pattern or dimple, the lubricant remaining in the lubrication part H allows lubrication of the contact surface.

Meanwhile, the rotating cam 300 may be eccentric to a side of the through-hole 240 of the gear plate 200, and the wedge cam 320 may be provided in pair at opposite sides between the rotating cam 300 and the inner circumferential surface of the through-hole 240 of the gear plate 200. Further, a bearing 244 may be coupled to the inner circumferential surface of the through-hole 240 of the gear plate 200, and the wedge cam 320 may be held between the rotating cam 300 and an inner circumferential surface of the bearing 244. Accordingly, the wedge cam 320 does not have an issue of lubrication with the bearing 244 on the gear plate 200 side and addresses the issue of lubrication only with the rotating cam 300. The rotating cam 300 and the wedge cam 320 are so small that it is difficult to install a separate bearing, and accordingly, through the structure of the lubrication part H of the present disclosure, the lubricant is preserved.

Figure 3:
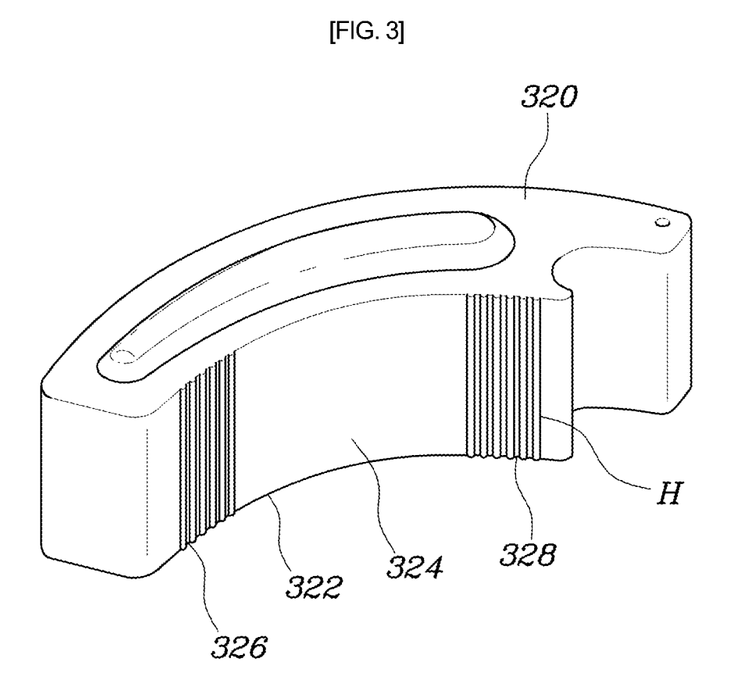
FIG. 3 is a perspective view of a wedge cam of the seat recliner for a vehicle shown in FIG. 1.

Further, as shown in FIG. 3, the contact surface 322 of the wedge cam 320 may be brought into contact with an outer circumferential surface of the rotating cam 300 at first and second end portions thereof, and may be spaced apart from the outer circumferential surface of the rotating cam 300 at a middle portion 324 thereof. Further, the lubrication part H may be provided at the first and second end portions 326 and 328 of the contact surface 322 of the wedge cam 320, with which the outer circumferential surface of the rotating cam 300 is brought into contact. This structure allows the first end portion 326 and the second end portion 328 at opposite sides of the wedge cam 320 to be brought into contact with the rotating cam 300, and allows the middle portion 324 therebetween to preserve the lubricant in a spaced space formed by being spaced apart from the rotating cam 300. Even though the edge of the wedge cam 320 pushes the lubricant, the lubricant remaining in the spaced space is supplied to the lubrication part H, so that the section where the wedge cam 320 and the rotating cam 300 are brought into contact with each other can be always lubricated.

The lubrication part H may be formed in various shapes. As shown in FIG. 3, the lubrication part H may be configured such that a plurality of grooves formed in a vertical direction is continuous to form a pattern. This structure has the advantage of preserving the lubricant since the lubricant filled in the vertical grooves is not swept away in the horizontal direction even if the wedge cam 320 and the rotating cam 300 are rubbed against each other.

Figure 5:
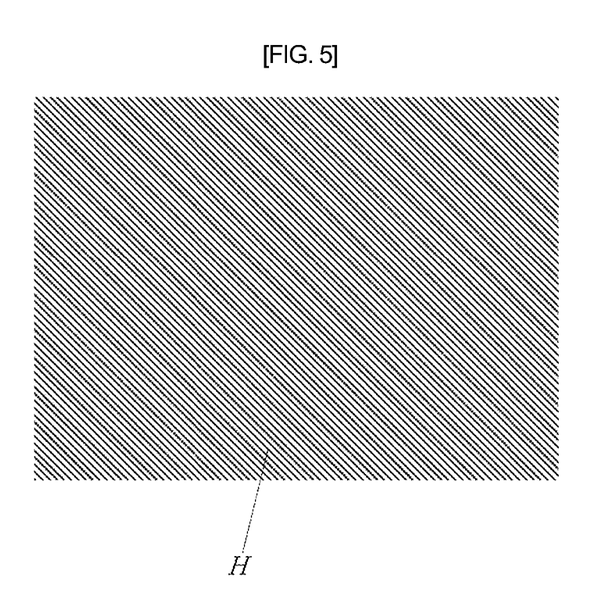
FIGS. 5 to 8 illustrate various patterns of a wedge cam of a seat recliner for a vehicle shown in FIG. 1 according to the present disclosure.

Further, as shown in FIG. 5, the lubrication part H may be configured such that a plurality of grooves formed in a diagonal direction is continuous to form a pattern. This structure allows the lubricant filled in the grooves to remain and also allows new lubricant to be introduced to the grooves.

Figure 6:
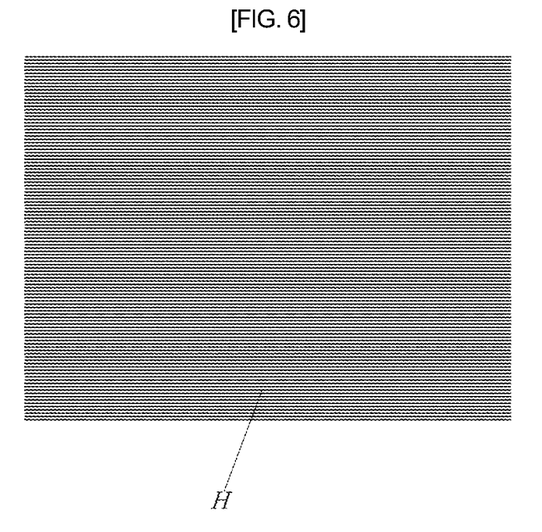

As shown in FIG. 6, the lubrication part H may be configured such that a plurality of grooves formed in a horizontal direction is continuous to form a pattern. This structure has the advantage of introducing new lubricant to the grooves since the grooves are open in the horizontal direction.

Figure 7:
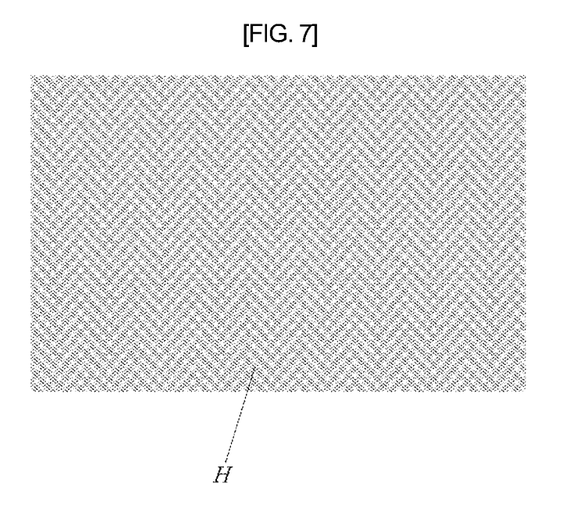

As shown in FIG. 7, the lubrication part H may be configured such that a plurality of grooves formed in a wave shape is continuous to form a pattern. This structure is formed in the horizontal direction but in a wave shape, so that the lubricant can be introduced and preserved simultaneously.

Figure 8:
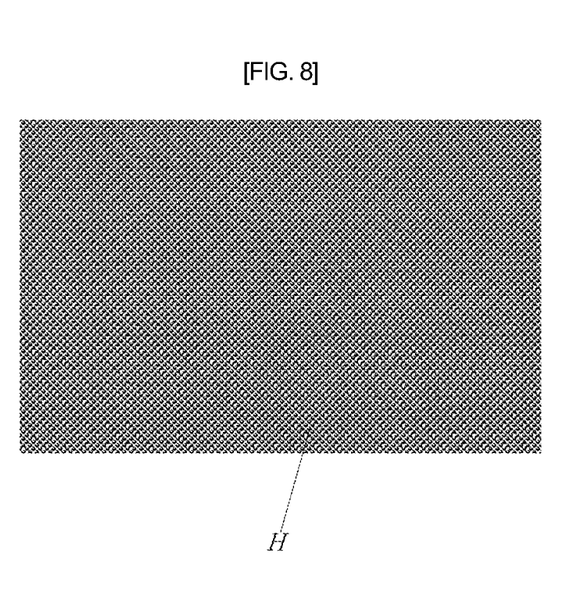

Further, as shown in FIG. 8, the lubrication part H may be configured such that a plurality of dimples is continuous at predetermined intervals to form a pattern. This structure is the best in terms of preserving the lubricant since it does not implement a continuous line by forming irregular grooves, and has the advantage of reducing the frictional force by reducing the contact area of the wedge cam and the rotating cam.

According to the seat recliner for a vehicle of the present disclosure, a pattern or dimple is formed on the contact surface of the wedge cam, thereby enhancing the lubrication between the wedge cam and the rotating cam, and thus, it is possible to inhibit wear or sticking of the wedge cam.

Although one form of the seat recliner of the present disclosure has been described for illustrative purposes, those skilled in the art will appreciate that various modifications, additions and substitutions are possible, without departing from the scope and spirit of the present disclosure as disclosed in the accompanying claims.

The description of the present disclosure is merely exemplary in nature and, thus, variations that do not depart from the substance of the present disclosure are intended to be within the scope of the disclosure. Such variations are not to be regarded as a departure from the spirit and scope of the disclosure.

What is claimed is:

1. A seat recliner for a vehicle, the seat recliner comprising:
    a flange including internal teeth on an inner circumferential surface;
    a gear plate having an outer diameter smaller than an inner diameter of the flange, the gear plate including external teeth along an edge configured to engage with the internal teeth of the flange such that the gear plate is eccentric to the flange, the gear plate defining a through-hole at a center;
    a rotating cam disposed at a center of the through-hole of the gear plate, and configured to be rotated by a shaft;
    a wedge cam between the rotating cam and an inner circumferential surface of the through-hole of the gear plate to maintain eccentricity of the rotating cam and the gear plate, the wedge cam including a lubrication part in a form of an engraved or embossed pattern or a dimple on a contact surface of the wedge cam, the lubrication part configured to preserve lubricant between the contact surface of the wedge cam and the rotating cam; and
    an elastic member configured to press the wedge cam between the rotating cam and the inner circumferential surface of the through-hole of the gear plate.

2. The seat recliner of claim 1, wherein the rotating cam is eccentric to a side of the through-hole of the gear plate, and a pair of wedge cams are disposed at opposite sides between the rotating cam and the inner circumferential surface of the through-hole of the gear plate.

3. The seat recliner of claim 1, wherein a bearing is coupled on the inner circumferential surface of the through-hole of the gear plate, and the wedge cam is held between the rotating cam and an inner circumferential surface of the bearing.

4. The seat recliner of claim 1, wherein the contact surface of the wedge cam includes a first and second end portion that contacts an outer circumferential surface of the rotating cam, wherein the wedge cam is spaced apart from the outer circumferential surface of the rotating cam at a middle portion of the contact surface of the wedge cam.

5. The seat recliner of claim 4, wherein the lubrication part is provided at each of the first and second end portions of the contact surface of the wedge cam.

6. The seat recliner of claim 1, wherein the lubrication part is configured such that a plurality of grooves formed in a vertical direction is continuous to form a pattern.

7. The seat recliner of claim 1, wherein the lubrication part is configured such that a plurality of grooves formed in a diagonal direction is continuous to form a pattern.

8. The seat recliner of claim 1, wherein the lubrication part is configured such that a plurality of grooves formed in a horizontal direction is continuous to form a pattern.

9. The seat recliner of claim 1, wherein the lubrication part is configured such that a plurality of grooves formed in a wave shape is continuous to form a pattern.

10. The seat recliner of claim 1, wherein the lubrication part is configured such that a plurality of dimples is continuous at predetermined intervals to form a pattern.

* * * * *